Patented Aug. 16, 1932

1,871,949

UNITED STATES PATENT OFFICE

HENRY T. BOTTRELL, OF SYDNEY, AUSTRALIA, ASSIGNOR TO REPULSO, INC., A CORPORATION OF NEW YORK

RODENT REPELLANT AND INSECTICIDAL COMPOSITION AND PROCESS OF PRODUCING THE SAME

No Drawing. Application filed April 10, 1928, Serial No. 269,016. Renewed March 12, 1931.

This invention relates to a composition of matter for use as a rodent or insect repellant; for use as an insecticide or deodorant; to the process of compounding the ingredients; and to the method of using such composition of matter.

The primary object of the invention is to provide a substance for use in treating fibrous materials, manufactured or raw, such as silk, cotton, hemp wood, wood pulp, beaver board, shop shelving, burlap, jute, straw board, card board, carpet, clothing, papers or the like, to render such materials immune from attack by rodents, insects or the like.

A further object is to furnish a substance of this character which will not alone repel insects, but also destroy insect life.

Another object is to provide a composition of matter suitable for use in treating plants or the like, to repel rodents and to repel and destroy insects.

A further object is to furnish a composition of matter having repellant and insecticidal properties, and which is inexpensive to manufacture, may be sprayed easily, will adhere firmly and is non-injurious to plant or animal life.

Another object is to provide a composition of matter capable of destroying fleas, moths, bed bugs, boll weevil, roaches, water bugs and the like.

With the above objects outlined, and with other objects in view which will appear as the description proceeds, the invention consists in the novel features hereinafter described in detail, and more particularly pointed out in the appended claims.

I have discovered a composition of matter including certain ingredients from which rodents, insects or the like will retreat, containing other ingredients which will destroy insects; and containing another ingredient which, due to its fumes, will drive insects out of concealment, and into contact with the destructive ingredients of the compound. I have so combined these ingredients that the same will adhere to one another, and will also adhere to the material treated by the mixture. The mixture of the materials is manufactured in concentrated form, so that it may be readily transported or stored in relatively small space.

The preferred form of the mixture includes ½% oil of peppermint; 1½% sodium benzoate; 2% sulphonethylmethane; 12½% animal glue; ½% wood alcohol; and 83% water.

In manufacturing the composition, the water is heated to about 212° F., and mixed with the animal glue, and this dissolves the glue, and then the alcohol is added to keep the same in solution. Afterwards, the oil of peppermint, sodium benzoate and sulphonethylmethane is added, and the mixture is put up in air-tight containers.

The oil of peppermint in the mixture emits fumes which penetrate crevices or the like to expel insects, and such insects coming in contact with the oil of peppermint and sodium benzoate, are destroyed. The oil of peppermint also repels insects, so that material treated with my composition, will not be attacked by such insects.

The sodium benzoate in the mixture acts to repel rodents and insects, and also destroys insects on contact.

The sulphonethylmethane functions to expel rodents and insects, and is so repulsive to rodents that it has been found in actual practice, that confined rodents will destroy one another before attacking a container of food coated with the composition.

The animal glue in the preparation, holds the materials together, and prevents the same from evaporating or being washed away, due to atmospheric conditions. The wood alcohol is added simply for the purpose of preventing the glue from setting. When the composition comes in contact with the air, the alcohol evaporates, but the remaining ingredients set firmly on the material treated, so that the composition remains potent indefinitely after it has once been applied.

Where the composition is to be used in the treatment of vegetation, such as trees, plants, flowers or the like, I prefer to add about ½% of creolin, which also acts as an insecticide.

The composition, after it has been manufactured, is always diluted with water for use, and is preferably mixed with about ten times as much or more water, as there is composition.

The composition can be used in a sprayer, or animals may be dipped in the same, or the material to be treated, may be dipped in the same.

In use, I have found that such composition repels rodents and like animals, and destroys insects, and when the substance has once been used on the material to be protected, rodents and insects will not only avoid contact with such material, but any insect life already in the material will be destroyed.

The composition of matter made in accordance with the present invention, may also be incorporated in certain substances when the latter are manufactured. For instance, in making card board, beaver board, plaster board, fibrous plaster, jute or the like, the liquid mixture may be used as the solution in the adhesive, and also as part of the adhesive.

The mixture is especially useful for the treatment of bags, boxes or the like, in which food is stored, and it has been found that rodents or the like, or insect life will not alone refrain from attacking containers sprayed or coated with my mixture, but will actually retreat from containers so treated.

The composition is practically colorless and odorless, and does not impair the taste of food substances with which it comes in contact.

While I have disclosed a preferred embodiment of the invention, it will be obvious that details may be changed without departing from the spirit of the invention, as expressed in the claims, and while I have set forth sulphonethylmethane as one of the principal ingredients, I wish it understood that in the claims, where this term is used, I desire to cover any material having repellant and insecticidal properties similar to sulphonethylmethane.

More specifically, in the claims, the term sulphonated hydrocarbon of the "sulphonethylmethane type" is intended to cover chemical equivalents of sulphonethylmethane which have repellant and insecticidal properties similar thereto.

What I claim and desire to secure by Letters Patent is:

1. A rodent repellant and insecticidal composition containing as an essential ingredient sulphonethylmethane.

2. A rodent repellant and insecticidal composition comprising an aqueous solution containing sulphonethylmethane, an adhesive, and an agent adapted to keep the adhesive in solution.

3. A rodent repellant and insecticidal composition comprising an aqueous solution containing approximately 2% of sulphonethylmethane.

4. The process of preparing a rodent repellant and insecticidal composition comprising treating an aqueous solution of glue with alcohol, then adding thereto sulphonethylmethane, and then allowing the alcohol to evaporate therefrom in the presence of the atmosphere.

HENRY T. BOTTRELL.